(12) United States Patent
Topham

(10) Patent No.: US 9,702,198 B1
(45) Date of Patent: Jul. 11, 2017

(54) POLYCRYSTALLINE DIAMOND COMPACTS AND METHODS OF FABRICATING SAME

(71) Applicant: US SYNTHETIC CORPORATION, Orem, UT (US)

(72) Inventor: Greg Carlos Topham, Spanish Fork, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 477 days.

(21) Appl. No.: 14/199,571

(22) Filed: Mar. 6, 2014

Related U.S. Application Data

(60) Provisional application No. 61/776,884, filed on Mar. 12, 2013.

(51) Int. Cl.
*E21B 10/46* (2006.01)
*B24D 18/00* (2006.01)
*E21B 10/567* (2006.01)
*F16C 33/04* (2006.01)

(52) U.S. Cl.
CPC ........ *E21B 10/5673* (2013.01); *F16C 33/043* (2013.01)

(58) Field of Classification Search
CPC ................................ B24D 18/00; E21B 10/46
See application file for complete search history.

(56) References Cited

U.S. PATENT DOCUMENTS

| | | | |
|---|---|---|---|
| 7,866,418 B2 | 1/2011 | Bertagnolli et al. | |
| 2008/0230280 A1* | 9/2008 | Keshavan | C22C 1/05 175/434 |
| 2011/0056141 A1 | 3/2011 | Miess et al. | |
| 2011/0088950 A1* | 4/2011 | Scott | C23C 30/005 175/57 |
| 2013/0292184 A1 | 11/2013 | Weaver | |

OTHER PUBLICATIONS

U.S. Appl. No. 61/776,884, filed Mar. 12, 2013, Topham.
U.S. Appl. No. 61/728,953, filed Nov. 21, 2012, Gleason et al.

* cited by examiner

*Primary Examiner* — Pegah Parvini
(74) *Attorney, Agent, or Firm* — Dorsey & Whitney LLP

(57) ABSTRACT

Embodiments of the invention relate to methods of fabricating leached polycrystalline diamond compacts ("PDCs") in which a polycrystalline diamond table thereof is leached and resized to provide a leached region having a selected geometry. Creating a leached region having such a selected geometry may improve the performance of the PDC in various conditions, such as impact strength and/or thermal stability.

15 Claims, 9 Drawing Sheets

POLYCRYSTALLINE DIAMOND COMPACTS AND METHODS OF FABRICATING SAME

CROSS-REFERENCE TO RELATED APPLICATIONS

This application claims priority to U.S. Provisional Application No. 61/776,884 filed on 12 Mar. 2013, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may optionally be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

In some situations, the presence of the metal-solvent catalyst in the PCD table may reduce the thermal stability of the PCD table at elevated temperatures. For example, the difference in thermal expansion coefficient between the diamond grains and the metal-solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD table.

Accordingly, the metal-solvent catalyst may be removed from the PCD table to improve its thermal stability. Chemical leaching is often used to dissolve and remove the metal-solvent catalyst from the PCD table.

SUMMARY

Embodiments of the invention relate to methods of fabricating leached PDCs in which a PCD table thereof is leached and resized to provide a leached region having a selected geometry. Creating a leached region having such a selected geometry may improve the performance of the PDC in various conditions, such as impact strength and/or thermal stability.

In an embodiment, a method for fabricating a leached PDC includes providing a PDC including a PCD table bonded to a substrate. The PCD table includes a plurality of bonded diamond grains defining a plurality of interstitial regions that include an interstitial constituent disposed therein. A first chamfer may be formed between an upper surface of the PCD table and at least one side surface of the PCD table. The first chamfer may exhibit a first chamfer height measured from the upper surface of the PCD table to a bottom of the first chamfer. After forming the first chamfer, a region of the PCD table may be leached to at least partially remove the interstitial constituent therefrom to form a leached region. After leaching, a second chamfer may be formed in the PCD table that extends between the upper surface and the at least one side surface of the PCD table. The second chamfer exhibits a second chamfer height.

In another embodiment, a method for fabricating a PDC includes providing a PDC including a PCD table bonded to a substrate. The PCD table includes an upper surface and at least one side surface. The PCD table further includes a leached region that is substantially free of an interstitial constituent and extends to a leach depth from the upper surface. The method further includes forming a chamfer extending between the upper surface and the at least one side surface of the PCD table. The chamfer has a chamfer height that is at least about equal to the leach depth In an embodiment, a PDC includes a substrate and a PCD table bonded to the substrate. The PCD table includes an upper surface, at least one side surface, and a chamfer extending between the upper surface and the at least one side surface. The chamfer exhibits a chamfer height measured from the upper surface to a bottom of the chamfer. The PCD table further includes a leached region from which an interstitial constituent is depleted. The leached region extends inwardly from the upper surface to a depth. The depth may be less than, substantially equal to, or greater than the chamfer height.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments of the invention relate to methods of fabricating leached PDCs in which a PCD table thereof is leached and resized to provide a leached region having a selected geometry. Creating a leached region having such a selected geometry may improve the performance of the PDC in various conditions, such as impact strength and/or thermal stability. The PDC embodiments disclosed herein may be used in a variety of applications, such as rotary drill bits, bearing apparatuses, wire-drawing dies, machining equipment, and other articles and apparatuses. Generally, in one or more embodiments, fabricating a leached PDC includes forming a PCD table in an HPHT process, forming a first chamfer in the PCD table, at least partially leaching the PCD table having the first chamfer by exposing the PCD table to a leaching agent, and forming a second chamfer in the leached PCD table.

Figure 1A:
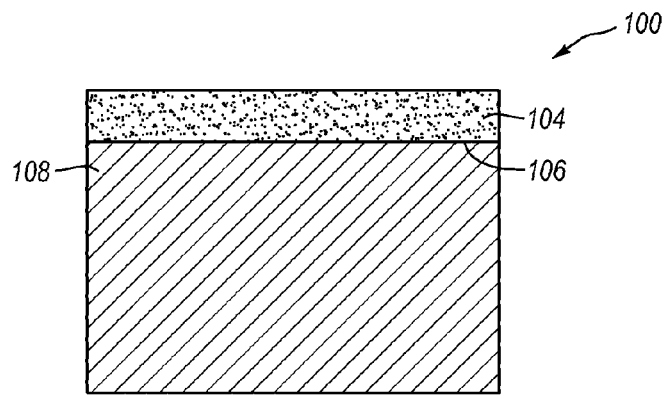
FIGS. 1A-1C are cross-sectional views illustrating different stages in a method of fabricating a PDC before the PDC is subjected to a leaching process according to an embodiment.
Figure 1B:
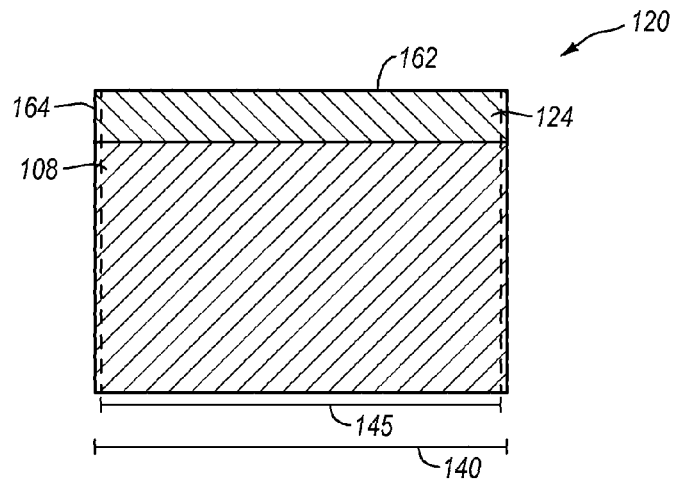
Figure 1C:
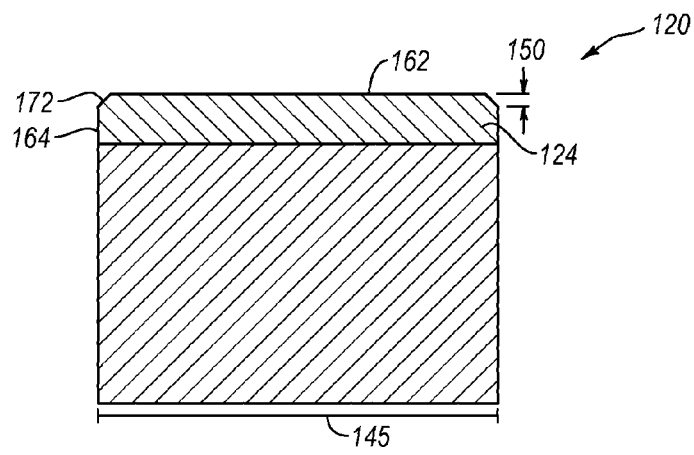

FIGS. 1A-1C are cross-sectional views illustrating different stages in a method of fabricating a PDC before the PDC is subjected to a leaching process according to an embodiment. Referring to FIG. 1A, a cross-sectional view of an assembly 100 is illustrated in which a plurality of diamond particles 104 (e.g., one or more, or two or more layers of diamond particles) are placed adjacent to a substrate 108. As shown in FIG. 1B, a PCD table 124 may be fabricated by subjecting the assembly 100 including the plurality of diamond particles 104 and the substrate 108 to an HPHT sintering process in the presence of a catalyst, such as a metal-solvent catalyst (e.g., cobalt, nickel, iron, or alloys thereof), a carbonate catalyst, or a combination of the preceding catalysts to facilitate intergrowth between the diamond particles 104 and form the PCD table 124 comprising directly bonded-together diamond grains (e.g., exhibiting sp$^3$ diamond-to-diamond bonding) defining interstitial regions having the catalyst or other interstitial constituent disposed within at least a portion of the interstitial regions. The PCD table 124 is integrally formed with the substrate 108.

In order to effectively HPHT sinter the plurality of diamond particles 104, the assembly 100, shown in FIG. 1A, may be placed in a pressure transmitting medium, such as a refractory metal can, graphite structure, pyrophyllite or other pressure transmitting structure, or another suitable container or supporting element. The pressure transmitting medium, including the assembly 100, may be subjected to an HPHT process using an HPHT press at a temperature of at least about 1000° C. (e.g., about 1300° C. to about 1600° C.) and a cell pressure of at least 4 GPa (e.g., about 5 GPa to about 10 GPa, about 7 GPa to about 9 GPa) for a time sufficient to sinter the diamond particles 104 and form the PCD table 124 that bonds to the substrate 108 during cooling from the HPHT process.

In the illustrated embodiment, the PCD table 124 is formed by HPHT sintering the diamond particles 104 on the substrate 108, which may be a cobalt-cemented tungsten carbide substrate from which cobalt or a cobalt alloy infiltrates into the diamond particles 104 and catalyzes formation of the PCD table 124. For example, the substrate 108 may comprise a cemented carbide material, such as a cobalt-cemented tungsten carbide material or another suitable material. For example, nickel, iron, or alloys thereof are other catalysts that may form part of the substrate 108. Other materials for the substrate 108 include, without limitation, cemented carbides including titanium carbide, niobium carbide, tantalum carbide, vanadium carbide, and combinations of any of the preceding carbides cemented with iron, nickel, cobalt, or alloys thereof.

However, in other embodiments, the substrate 108 may be replaced with a catalyst material disc and/or catalyst particles may be mixed with the diamond particles 104. As discussed above, in other embodiments, the catalyst may be a carbonate catalyst selected from one or more alkali metal carbonates (e.g., one or more carbonates of Li, Na, and K), one or more alkaline earth metal carbonates (e.g., one or more carbonates of Be, Mg, Ca, Sr, and Ba), or combinations of the foregoing. The carbonate catalyst may be partially or substantially completely converted to a corresponding oxide of Li, Na, K, Be, Mg, Ca, Sr, Ba, or combinations after HPHT sintering of the plurality of diamond particles 104.

The diamond particle size distribution of the plurality of diamond particles 104 may exhibit a single mode, or may be a bimodal or greater grain size distribution. In an embodiment, the diamond particles 104 may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles 104 may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles 104 may include a portion exhibiting a relatively larger average particle size between about 10 μm and about 40 μm and another portion exhibiting a relatively smaller average particle size between about 1 μm and 4 μm. In some embodiments, the diamond particles 104 may comprise three or more different average particle sizes (e.g., one relatively larger average particle size and two or more relatively smaller average particle sizes), without limitation.

In another embodiment, the diamond particles 104 shown in FIG. 1A may be replaced with another type of diamond volume. For example, the diamond particles 104 may be replaced with a porous, at least partially leached PCD table that is infiltrated with a cementing constituent from the substrate 108 (e.g., a cobalt metallic infiltrant) and attached thereto during an HPHT process using any of the diamond-stable HPHT process conditions disclosed herein. For example, the cementing constituent from the substrate 108 shown in FIG. 1A may partially or substantially completely infiltrate into the at least partially leached PCD table. Upon cooling from the HPHT process, a strong metallurgical bond is formed between the infiltrated PCD table and the substrate. In other embodiments, another metallic infiltrant may be disposed between the at least partially leached PCD table and the substrate 108 that partially or substantially completely infiltrates into the at least partially leached PCD table. The at least partially leached PCD table includes a plurality of directly bonded-together diamond grains exhibiting diamond-to-diamond bonding therebetween (e.g., $sp^3$ bonding). The plurality of directly bonded-together diamond grains define a plurality of interstitial regions. The interstitial regions form a network of at least partially interconnected pores that enable fluid to flow from one side to an opposing side. For example, the at least partially leached PCD table may be formed by removing the PCD table 124 from the substrate 108 and subjecting the removed PCD table to a leaching process to substantially remove the catalyst therein.

FIG. 1B is a cross-sectional view of a PDC 120 formed by HPHT processing of the assembly 100 shown in FIG. 1A. In such an embodiment, the PCD table 124 so-formed may include tungsten and/or tungsten carbide that is swept in with the catalyst from the substrate 108. For example, some tungsten and/or tungsten carbide from the substrate may be dissolved or otherwise transferred by the liquefied catalyst (e.g., cobalt from a cobalt-cemented tungsten carbide substrate) of the substrate 108 that sweeps into the diamond particles 104. The PCD table 124 includes a plurality of directly bonded-together diamond grains exhibiting diamond-to-diamond bonding there between (e.g., $sp^3$ bonding) defining interstitial regions with the catalyst disposed within at least a portion of the interstitial regions. The PCD table 124 also becomes metallurgically bonded to the substrate 108 during HPHT processing of the assembly 100.

More details about the manner in which the PDC 120 and/or the PCD table 124 may be formed may be found in U.S. Pat. No. 7,866,418, which is incorporated herein, in its entirety, by this reference. U.S. Pat. No. 7,866,418 discloses various embodiments for fabricating PCD and PDCs at ultra-high cell pressures. For example, PCD sintered at a cell pressure of at least about 7.5 GPa may exhibit a coercivity of 115 Oe or more, a high-degree of diamond-to-diamond bonding, a specific magnetic saturation of about 15 G·cm³/g or less, and a metal-solvent catalyst content of about 7.5 weight % ("wt %") or less, such as about 1 wt % to about 6 wt %, about 1 wt % to about 3 wt %, about 3 wt % to about 6 wt %, greater than 0 to about 6 wt %, or less than 6 wt %. Generally, as the sintering cell pressure that is used to form the PCD increases, the coercivity may increase and the magnetic saturation may decrease.

The PCD table 124 defined collectively by the bonded diamond grains and the catalyst may exhibit a coercivity of about 115 Oe or more and a metal-solvent catalyst content of less than about 7.5 wt % (e.g., as may be indicated by a specific magnetic saturation of about 15 G·cm³/g or less). In another embodiment, the coercivity of the PCD may be about 115 Oe to about 250 Oe and the specific magnetic saturation of the PCD may be greater than 0 G·cm³/g to about 15 G·cm³/g. In yet another embodiment, the coercivity of the PCD may be about 115 Oe to about 175 Oe and the specific magnetic saturation of the PCD may be about 5 G·cm³/g to about 15 G·cm³/g. Further, in another embodiment, the coercivity of the PCD may be about 155 Oe to about 175 Oe and the specific magnetic saturation of the PCD may be about 10 G·cm³/g to about 15 G·cm³/g. The specific permeability (i.e., the ratio of specific magnetic saturation to coercivity) of the PCD may be about 0.10 G·cm³/g·Oe or less, such as about 0.060 G·cm³/g·Oe to about 0.090 G·cm³/g·Oe. Despite the average grain size of the bonded diamond grains being less than about 30 µm in some embodiments, the catalyst content in the PCD may be less than about 7.5 wt % to thereby result in a desirable thermal stability.

In some embodiments, the PDC 120 so-formed may be subjected to a number of different shaping operations. For example, an upper working surface 162 of the PCD table 124 may be planarized and/or polished.

Referring to FIG. 1C, a peripherally-extending first chamfer 172 may be formed in the PCD table 124 that extends between the upper working surface 162 and the at least one side surface 164 of the PCD table 124. A chamfer height 150 (also shown in FIG. 2B) is measured from the upper working surface 162 to a bottom/lowest point of the chamfer 172 on the at least one side surface 164. For example, the first chamfer 172 may have a height of less than about 400 µm, less than about 100 µm, less than 20 µm, about 20 µm to about 300 µm, or about 100 µm to about 250 µm.

The first chamfer 172 may be formed by grinding, wire electro-discharge machining ("EDM"), laser machining, combinations thereof, or another suitable material-removal process. Additionally, the presence of the first chamfer 172 prior to leaching may influence the resulting leach region geometry.

Optionally, in some embodiments, a circumferential or other lateral portion of the substrate 108 and the PCD table 124 of the PDC 120 may be removed prior to leaching. For example, the PDC 120 of FIG. 1B is depicted as having first diameter 140, or other lateral dimension if the PDC 120 is not cylindrical. A circumferential or other lateral portion of the PDC 120 may be removed such that the PDC 120 of FIG. 1B exhibits a second diameter 145 or other lateral dimension if PDC 120 is not cylindrical, as shown in FIGS. 1B and 1C. For example, the circumferential or other lateral portion exceeding second diameter 145 of the PDC 120 may be removed by grinding (e.g., centerless grinding), wire EDM, laser machining, combinations thereof, or another suitable material-removal process.

Figure 2A:
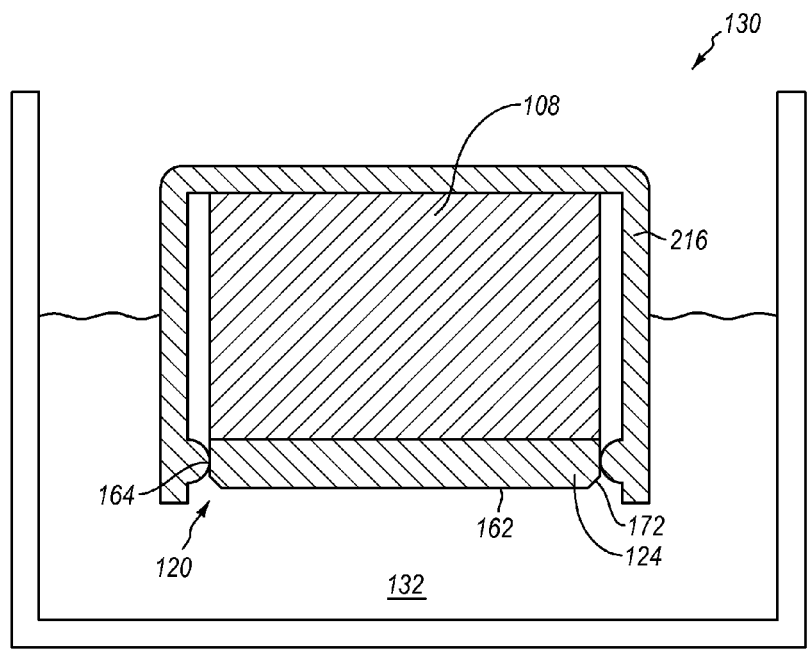
FIG. 2A is a cross-sectional view illustrating a method of leaching a PCD table of the PDC shown in FIG. 1C according to an embodiment.

Referring to FIG. 2A, the PCD table 124 having the first chamfer 172 may be subjected to a leaching process. The PCD table 124 may be leached with a leaching agent 132 to at least partially remove the catalyst from the PCD table 124 to a selected maximum leach depth "d" (shown in FIG. 2B) measured from any of the upper working surface 162, chamfer 172, and/or at least one side surface 164. For example, the PDC 120 may be enclosed in a leaching vessel 130, as illustrated in FIG. 2A, containing a flow or stagnant volume of the leaching agent 132 (e.g., hydrofluoric acid, nitric acid, hydrochloric acid, aqua regia, combinations thereof, or any other suitable leaching agent) to leach the catalyst from the PCD table 124 to form a leached region 224 (shown in FIG. 2B). The leached region 224 may be at least partially depleted of the catalyst (e.g., substantially free of the catalyst) and located remote from the substrate 108. An un-leached region 226, proximate to the substrate 108, is relatively unaffected by the leaching process and includes the catalyst therein in the interstitial regions.

In the illustrated embodiment, the PDC 120 may be at least partially surrounded by a protective layer 216. At least a portion of the PDC 120, including the substrate 108, may be surrounded by the protective layer 216. In an embodiment, the protective layer 216 can comprise a mask or other protective coating. For example, the protective layer 216 is illustrated in FIG. 2A as an inert cup as disclosed in U.S. Provisional Application No. 61/728,953, which is incorporated herein, in its entirety, by this reference. However, any protective structure for leaching disclosed in U.S. Provisional Application No. 61/728,953 may be employed. The protective layer 216 may limit or prevent the leaching agent 132 from substantially chemically damaging certain portions of the PDC 120, such as the substrate 108 and/or a selected portion of the PCD table 124 during leaching. The protective layer 216 may be selectively formed and/or provided over the substrate 108 and a selected portion of the PCD table 124 in varied patterns, designs, or as otherwise desired, without limitation. Such a configuration may enable selective leaching of the PCD table 124.

In another embodiment, selected portions of the PCD table 124 may be subjected to a masking treatment to mask areas that are desired to remain unaffected by the leaching process, such as portions of the un-leached region 226 at and/or near the substrate 108. For example, electrodeposition or plasma deposition of a nickel alloy (e.g., a suitable Inconel® alloy), a suitable metal, or another suitable metallic alloy covering the substrate 108 and the un-leached region 226 (shown in FIG. 2B) may be used to limit the leaching process to the desired directed area of the leached region 224 (shown in FIG. 2B). In other embodiments, protective leaching trays (not shown in FIG. 2A) for protecting portions of the PCD table 124 and the substrate 108 from leaching agents during leaching may be used. Examples of such protective trays are further described within U.S. Provisional Application No. 61/728,953, which was previously incorporated by reference.

Figure 2B:
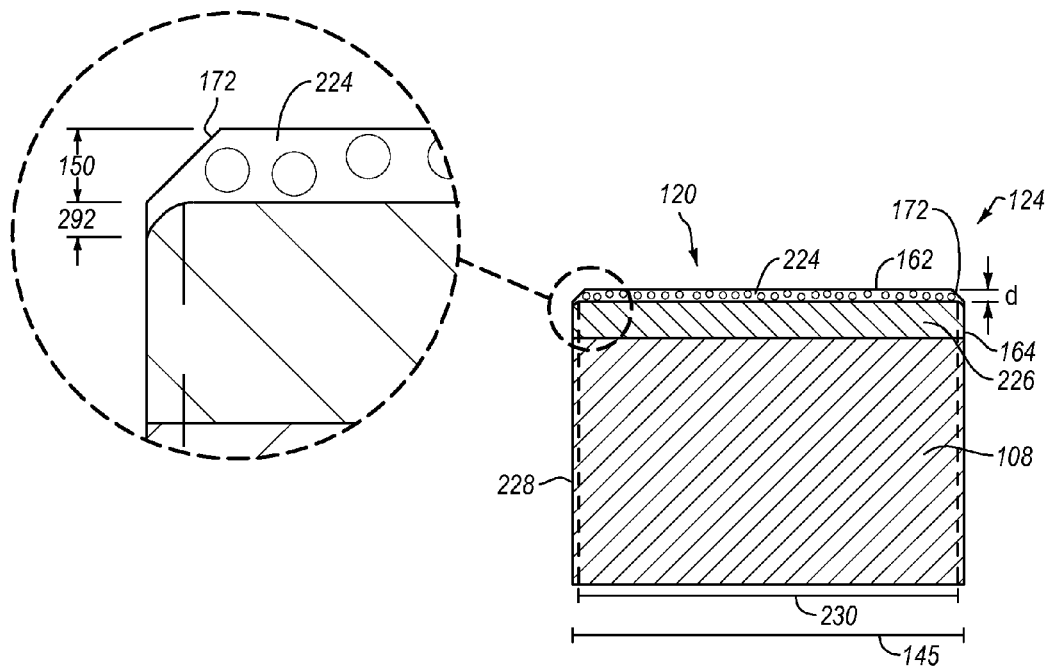
FIGS. 2B and 2C are cross-sectional views illustrating different stages in finishing a PDC that has previously been leached according to an embodiment.

FIG. 2B is a cross-sectional view of the PDC 120 after subjecting the PCD table 124 to the leaching process as described above with respect to FIG. 2A. In an embodiment, the leach depth "d" (shown in FIG. 2B) to which the leached region 224 extends may be greater than about 200 µm. In another embodiment, the leach depth "d" may be about 50 µm to about 800 µm. In another embodiment, the leach depth "d" may be about 400 µm to about 800 µm, about 100 µm to about 300 µm, or about 250 µm to about 800 µm.

As shown in FIG. 2B, the first chamfer 172 has a height 150. Additionally, the leached region 224 may optionally extend down the at least side surface 164 of the PCD table 124. As previously stated above, it may be desirable to form the leached region 224 having a selected geometry. For example, it may be desirable to limit the volume or area that the leached region 224 occupies in the PCD table 124.

In an embodiment, after the PDC 120 has been subjected to the leaching process, a circumferential portion of the PDC 120 or other lateral portion (if the PDC 120 is not cylindrical) may be optionally removed. For example, the PDC 120 of FIG. 2B is depicted as having the second diameter 145. The circumferential or other lateral portion of the PDC 120 may be removed such that the PDC 120 has a final diameter 230. For example, the circumferential or other lateral portion of the PDC 120 may be removed by grinding (e.g., centerless grinding), wire EDM, laser machining, combinations thereof, or another suitable material-removal process. In an embodiment, the difference between the final diameter 230 and second diameter 145 is substantially equal to any of the disclosed heights or height ranges for the first chamfer height 150.

Figure 2C:
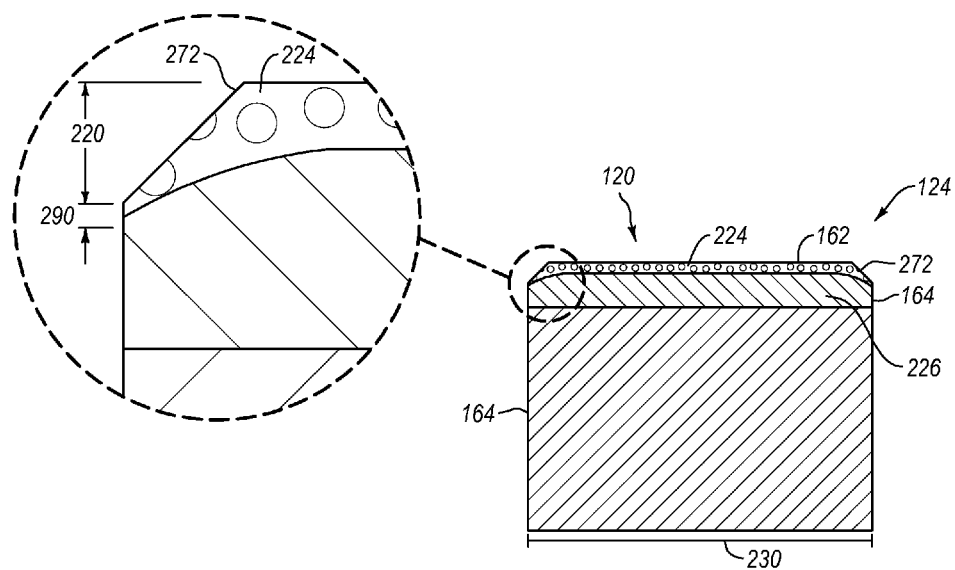

Referring now to FIG. 2C, after the PDC has been subjected to the leaching process, a second chamfer 272 may be formed to selectively tailor a geometry of the leached region 224 and effectively replace the first chamfer 172. For example, the second chamfer 272 may be formed by grinding, wire EDM, laser machining, combinations thereof, or another suitable material-removal process. Similar to the first chamfer 172, the second chamfer 272 extends between the upper working surface 212 and the at least one side surface 164 of the PCD table 124. In an embodiment, the second chamfer 272 may exhibit a height 220, which is greater than the height 150 of the first chamfer 172. For example, the height 150 of the first chamfer 172 may be approximately 254 µm, while the height 220 of the second chamfer 272 may be approximately 500 µm. In other embodiments, the height 220 of the second chamfer 272 may be about 1.5 to about 3 times the height 150 of the first chamfer 172, such as about 1.5 to about 2 times. For example, the height 220 of the second chamfer 272 may be less than about 600 µm, less than about 500 µm, less than 200 µm, about 100 µm to about 300 µm, or about 200 µm to about 400 µm. The reader will understand that sizes and relative shapes of the chamfers and leached regions 224 depicted in FIGS. 2A-2F are only meant to illustrate various embodiments of the invention and other geometries are contemplated by this disclosure.

Figure 2D:
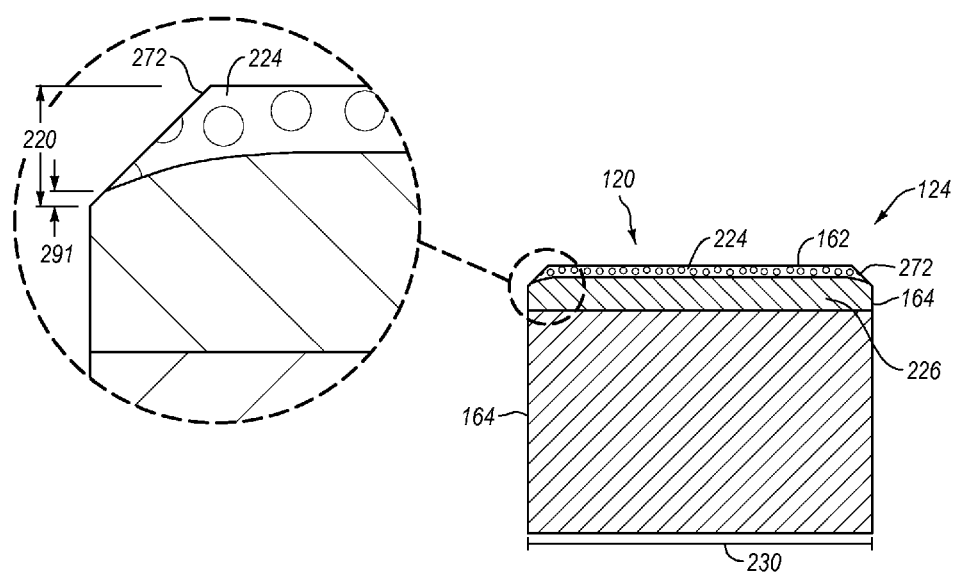
FIGS. 2D-2F are cross-sectional views illustrating different leached region geometries with respect to the second chamfer according to various embodiments.
Figure 2E:
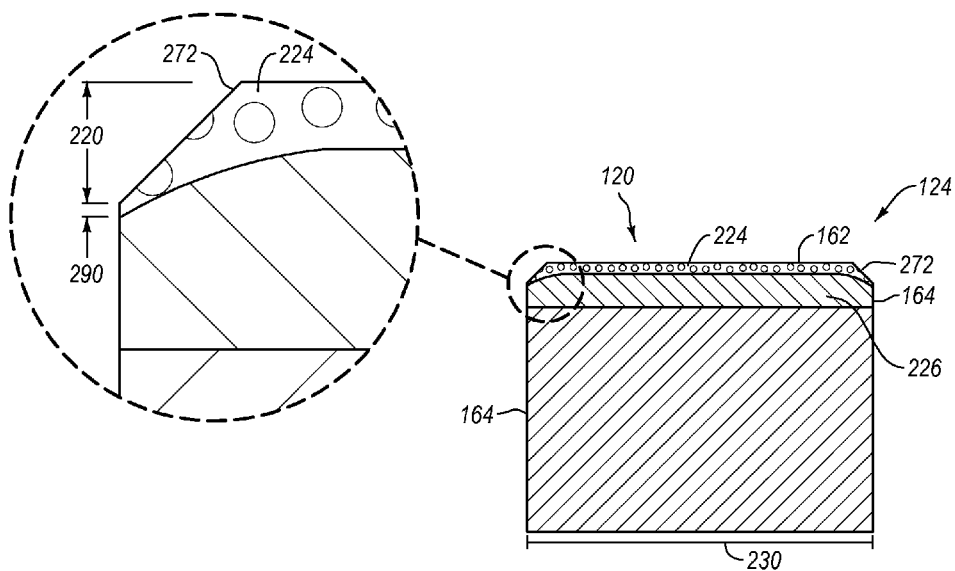
Figure 2F:
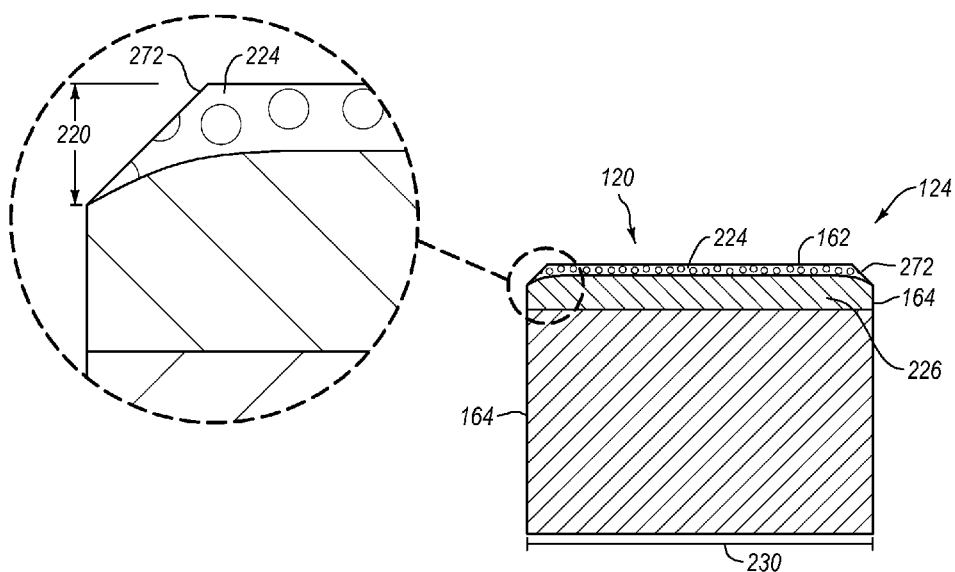

Prior to forming the second chamfer 272, the leached region 224 may exhibit a substantially uniform depth with respect to any of the working surface 162, the first chamfer 172, or the at least one side surface 164. After forming the second chamfer 272, the leached region 224 may no longer exhibit a substantially uniform depth and/or may exhibit a different profile because material from the PCD table 124 is removed inwardly from the first chamfer 172. For example, the leached region 224 shown in FIG. 2C after forming the second chamfer 272 may terminate proximate to a bottom edge of the second chamfer 272. The leach depth as measured generally perpendicularly and inwardly from the second chamfer 272 may also decrease (e.g., substantially continuously decrease) along the second chamfer 272 with distance toward the at least one side surface 164. In particular, a distance 290 between a bottom of the leached region 224 and a bottom of the second chamfer 272 shown in FIG. 2C may be substantially less than a distance 292 between a bottom of the first chamfer 172 and a bottom of the leached region 224 shown in FIG. 2B. For example, in an embodiment, the distance 290 is less than about 100 µm, less than about 50 µm, less than about 75 µm, less than about 10 µm, about 50 µm to about 100 µm, about 20 µm to about 50 µm, or about 30 µm to about 75 µm. Further still, in another embodiment (as depicted in FIG. 2F), the distance 290 is approximately zero, such that the bottom of the leached region 224 and the bottom of the second chamfer 272 are approximately equal and co-located (i.e., the depth of the leached region 224 being about equal to the second chamfer height 220).

As discussed briefly above, in various embodiments, the location of bottom of the leached region 224 with respect to the second chamfer 272 and/or a geometry of the leached region 224 may be adjusted based upon the geometry of the leached region 224 prior to forming the second chamfer 272 and the amount of material removed from the PCD table 124 to define the second chamber 272. For example, as shown in FIG. 2A, the protective layer 216 covers up to approximately the bottom of the first chamfer 172. However, the protective masks or cups may be selectively placed in other locations such that leached regions of various sizes and shapes may be formed, which in conjunction with the amount of material removed from the PCD table 124 to form the second chamfer 272, may affect the location of the bottom of the leached region 224 after forming the second chamfer 272. Thus, the depth of the leached region 224 may be less than or substantially equal to the height 220 of the second chamfer 272. In some embodiments, the depth of the leached region 224 may be greater than the height 220 of the second chamfer 272. In an embodiment, FIG. 2D illustrates the PDC 120 in which the bottom of the leach region 224 is above the bottom of the second chamfer 272 by a distance 291. For example, the distance 291 may be less than about 100 µm, less than about 50 µm, less than about 75 µm, less than about 10 µm, about 50 µm to about 100 µm, about 20 µm to about 50 µm, or about 30 µm to about 75 µm. In another embodiment, FIG. 2E shows the PDC 120 in which the bottom of the leached region 224 extends below the second chamfer 272 the distance 290. Further, in another embodiment, FIG. 2F illustrates the PDC 120 in which the bottom of the leached region 224 is substantially at the bottom of the second chamfer 272.

It is currently believed by the inventor that limiting the extent of the leached region 224 may increase the impact resistance of the PCD table 124, such as resistance to cracking. Specifically, it is currently believed by the inventor that the PCD table 124 having the selectively tailored geometry may exhibit greater performance under both high heat and high impact applications.

The reader will understand that the above-recited methods may be performed in alternate sequences. For example, as a non-limiting example, after the leaching process is applied, the second diameter 145 of the PDC 120 may be first ground down to the final diameter 230 and then the second chamfer 272 may be formed, or alternatively, the second chamfer 272 may be formed first and then the second diameter 145 may be ground down to the final diameter 230.

Figure 2G:
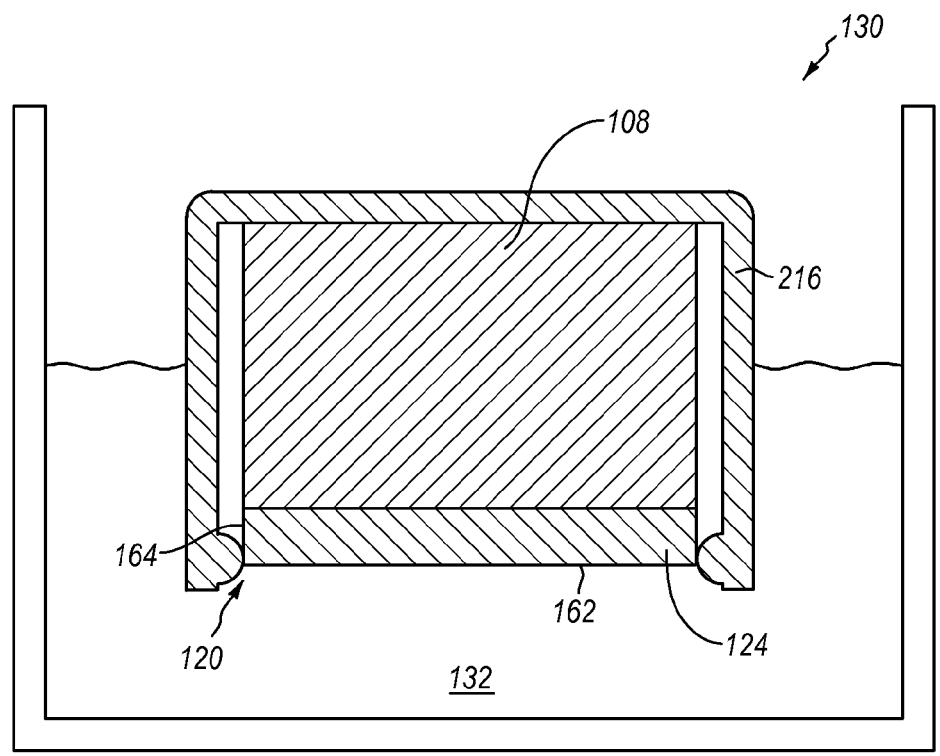
FIGS. 2G-2I are cross-sectional views illustrating a method of forming a PDC according to another embodiment.

In other embodiments, only a single chamfer may be employed to form a leached region defined by a generally horizontal boundary with the underlying, un-leached region. For example, in FIG. 2G, the PCD table 124 without a chamfer may be subjected to a leaching process as previously described herein. The PCD table 124 may be leached with the leaching agent 132 to at least partially remove the interstitial constituent (e.g., catalyst or infiltrant) from the PCD table 124 to a selected maximum leach depth "d" (shown in FIG. 2H) measured from the upper working surface 162. For example, the PDC 120 may be enclosed in the leaching vessel 130, as illustrated in FIG. 2G, containing a flow or stagnant volume of the leaching agent 132 (e.g., hydrofluoric acid, nitric acid, hydrochloric acid, aqua regia, combinations thereof, or any other suitable leaching agent) to leach the catalyst from the PCD table 124 to form a leached region 224 (shown in FIG. 2H). The leached region 224 may be at least partially depleted of the interstitial constituent (e.g., substantially free of the interstitial constituent) and located remote from the substrate 108. An un-leached region 226, proximate to the substrate 108, is relatively unaffected by the leaching process and includes the catalyst therein in the interstitial regions.

Figure 2H:
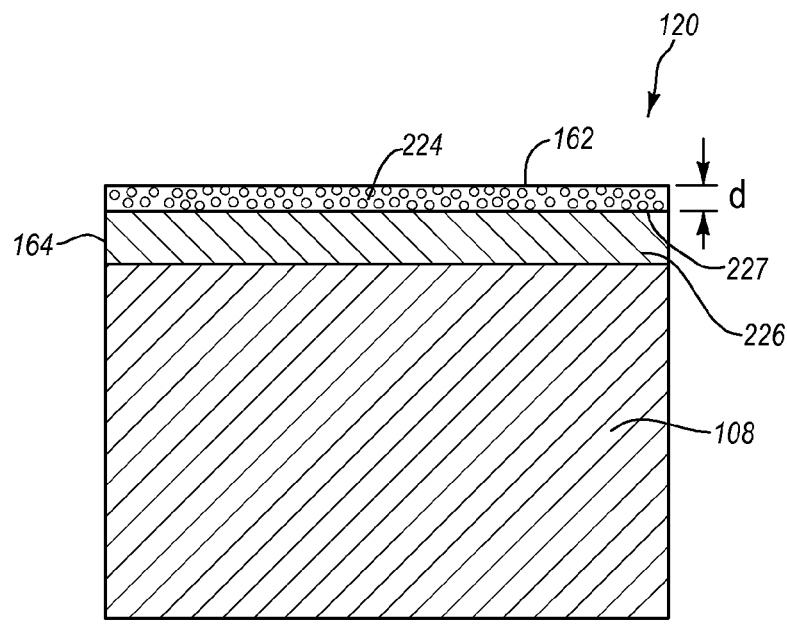
Figure 2I:
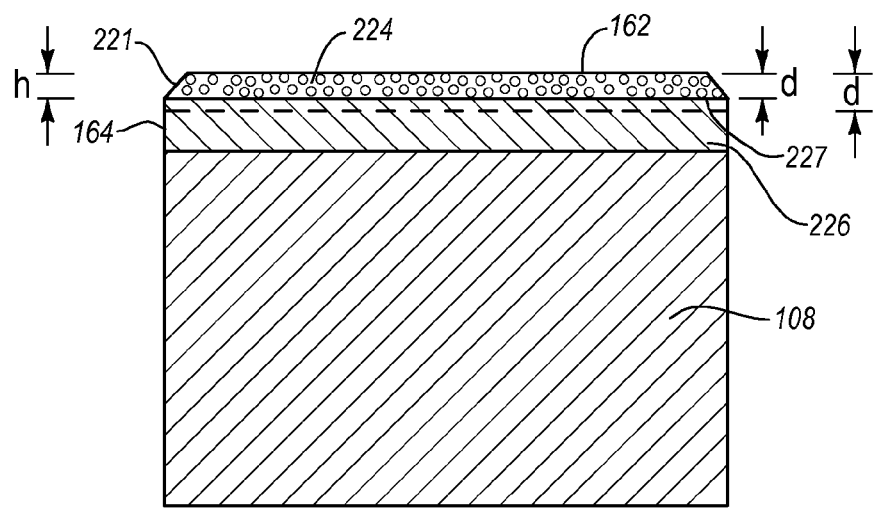

In the illustrated embodiment, the PDC 120 may be at least partially surrounded by the protective layer 216. At least a portion of the PDC 120, including the substrate 108, may be surrounded by the protective layer 216 or any other protective structure for leaching disclosed herein. For example, seal element 217 of the protective layer 216 may be positioned adjacent to the upper surface 162 of the PCD table 124. As shown in FIG. 2H, after leaching, the leached region 224 extends to the selected maximum leach depth "d" to define generally horizontal boundary 219 between the leached region 224 and the un-leached region 226. For example, the generally horizontal boundary 219 may be substantially parallel to the upper surface 162 of the PCD table 124 and the interfacial surface of the substrate 108 bonded to the PCD table 124. Referring to FIG. 2I, a chamfer 221 may be formed between the at least one side surface 164 and the upper surface 162. In some embodiments, the selected depth "d" may be substantially equal to a height 223 of the chamfer 221. In other embodiments, the selected maximum leach depth "d" may be greater than the height 223 of the chamfer 221 as indicated by the dashed generally horizontal boundary 227. The selected maximum leached depth "d" may be greater than about 200 µm, about 50 µm to about 800 µm, about 400 µm to about 800 µm, about 400 µm to about 800 µm, about 100 µm to about 300 µm, or about 250 µm to about 800 µm.

In some embodiments, a circumferential or other lateral portion of the substrate 108 and the PCD table 124 of the PDC 120 may be removed prior to leaching or after leaching. For example, the PDC 120 of FIG. 1B is depicted as having first diameter 140, or other lateral dimension if the PDC 120 is not cylindrical. A circumferential or other lateral portion of the PDC 120 may be removed such that the PDC 120 of FIG. 2G exhibits a second, reduced diameter or other lateral dimension if PDC 120 is not cylindrical. For example, the circumferential or other lateral portion may be removed by grinding (e.g., centerless grinding), wire EDM, laser machining, combinations thereof, or another suitable material-removal process. In other embodiments, a circumferential or other lateral portion of the PDC 120 may be removed after leaching and/or after forming the chamfer 221.

Figure 3:
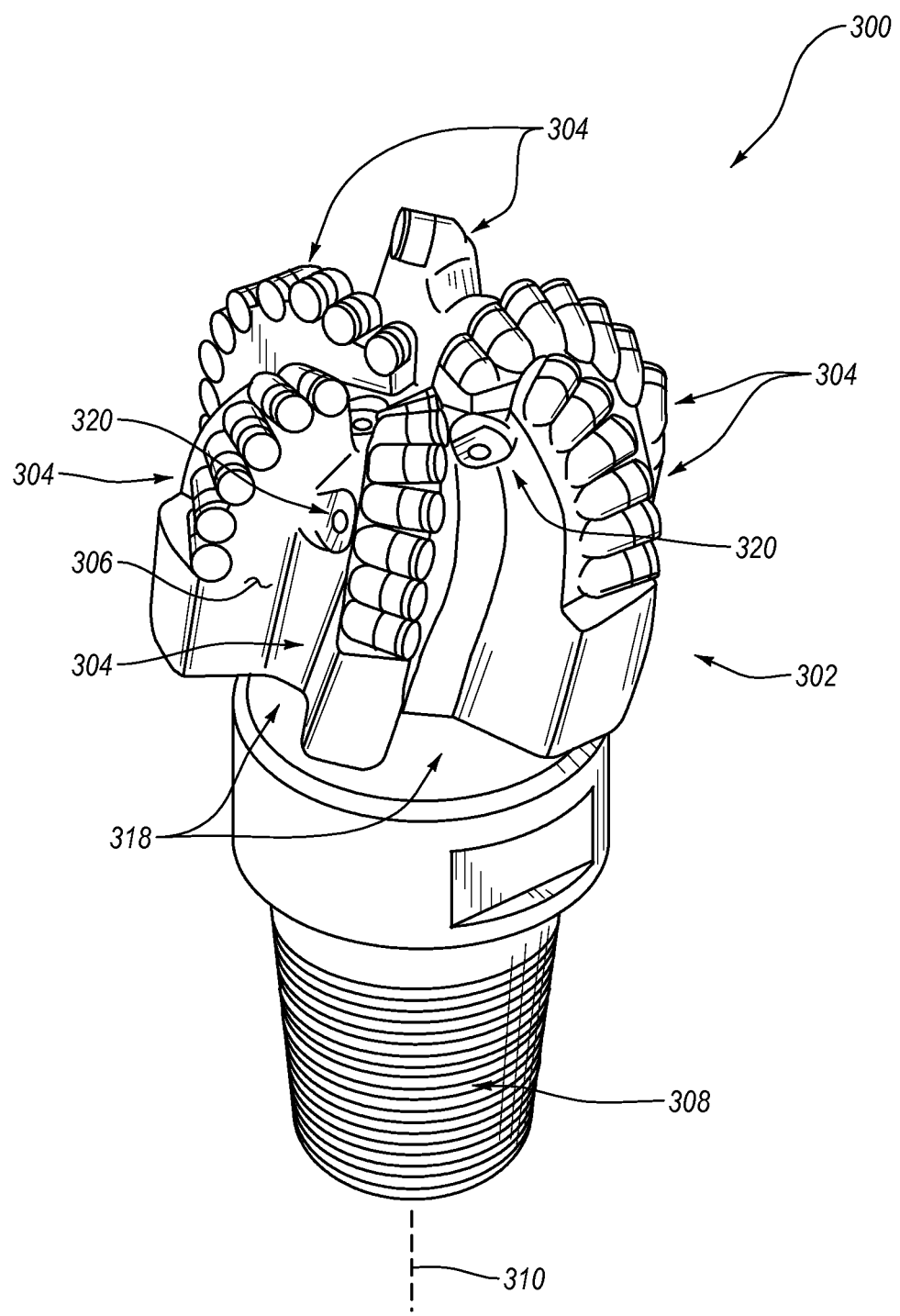
FIG. 3 is an isometric view of a rotary drill bit according to an embodiment that may employ one or more of the PDCs fabricated according to any of the embodiments disclosed herein.
Figure 4:
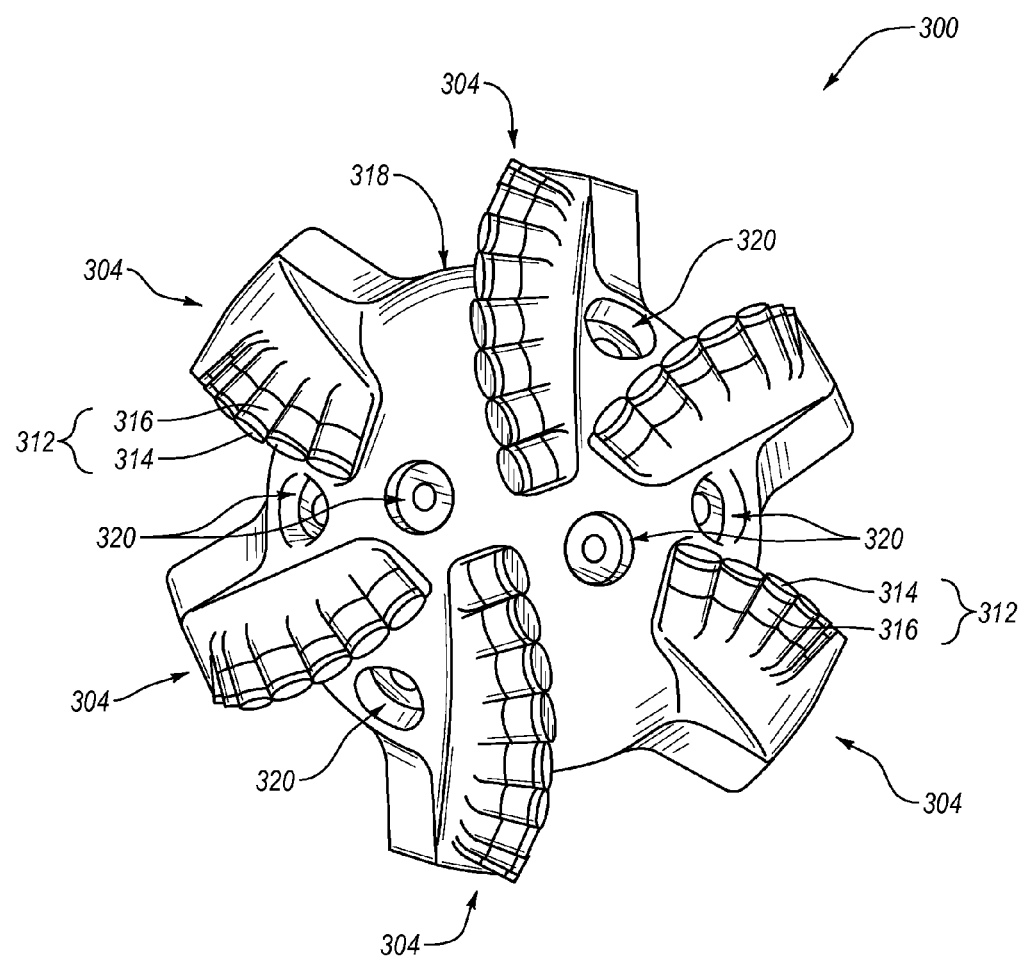
FIG. 4 is a top elevation view of the rotary drill bit shown in FIG. 3.

FIG. 3 is an isometric view and FIG. 4 is a top elevation view of a rotary drill bit 300 according to an embodiment. The rotary drill bit 300 includes at least one PDC fabricating according to any of the previously described PDC embodiments. The rotary drill bit 300 comprises a bit body 302 that includes radially and longitudinally extending blades 304 with leading faces 306, and a threaded pin connection 308 for connecting the bit body 302 to a drilling string. The bit body 302 defines a leading end structure configured for drilling into a subterranean formation by rotation about a longitudinal axis 310 and application of weight-on-bit. At least one PDC cutting element, manufactured and configured according to any of the previously described PDC embodiments (e.g., the PDC 120 shown in FIG. 2C), may be affixed to rotary drill bit 300 by, for example, brazing, mechanical affixing, or another suitable technique.

With reference to FIG. 4, each of a plurality of PDCs 312 is secured to the blades 304. For example, each PDC 312 may include a PCD table 314 bonded to a substrate 316. More generally, the PDCs 312 may comprise any PDC disclosed herein, without limitation. In addition, if desired, in an embodiment, a number of the PDCs 312 may be conventional in construction. Also, circumferentially adjacent blades 304 define so-called junk slots 318 there between, as known in the art. Additionally, the rotary drill bit 300 includes a plurality of nozzle cavities 320 for communicating drilling fluid from the interior of the rotary drill bit 300 to the PDCs 312.

FIGS. 3 and 4 merely depict one embodiment of a rotary drill bit that employs at least one cutting element comprising a PDC fabricated and structured in accordance with the disclosed embodiments, without limitation. The rotary drill bit 300 is used to represent any number of earth-boring tools or drilling tools, including, for example, core bits, roller-cone bits, fixed-cutter bits, eccentric bits, bicenter bits, reamers, reamer wings, mining rotary drill bits, or any other downhole tool including PDCs, without limitation.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, PCD windows, and heat sinks.

Figure 5:
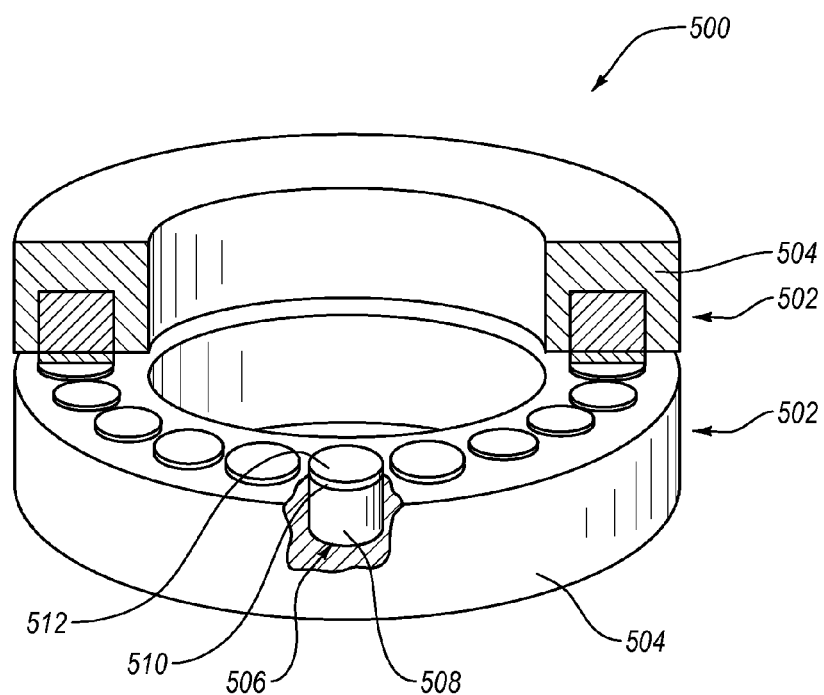
FIG. 5 is an isometric cutaway view of a thrust-bearing apparatus according to an embodiment, which may utilize any of the disclosed PDC fabricated according to any of the embodiments disclosed herein as bearing elements.

FIG. 5 is an isometric cutaway view of a thrust-bearing apparatus 500 according to an embodiment, which may utilize any of the disclosed PDC embodiments as bearing elements. The thrust-bearing apparatus 500 includes respective thrust-bearing assemblies 502. Each thrust-bearing assembly 502 includes an annular support ring 504 that may be fabricated from a material, such as carbon steel, stainless steel, or another suitable material. Each support ring 504 includes a plurality of recesses (not labeled) that receives a corresponding bearing element 506. Each bearing element 506 may be mounted to a corresponding support ring 504 within a corresponding recess by brazing, press-fitting, using fasteners, combinations thereof, or another suitable mounting technique. One or more, or all of bearing elements 506 may be manufactured and configured according to any of the disclosed PDC embodiments. For example, each bearing element 506 may include a substrate 508 and a PCD table 510, with the PCD table 510 including a bearing surface 512.

In use, the bearing surfaces 512 of one of the thrust-bearing assemblies 502 bears against the opposing bearing surfaces 512 of the other one of the bearing assemblies 502. For example, one of the thrust-bearing assemblies 502 may be operably coupled to a shaft to rotate therewith and may be termed a "rotor." The other one of the thrust-bearing assemblies 502 may be held stationary and may be termed a "stator."

Figure 6:
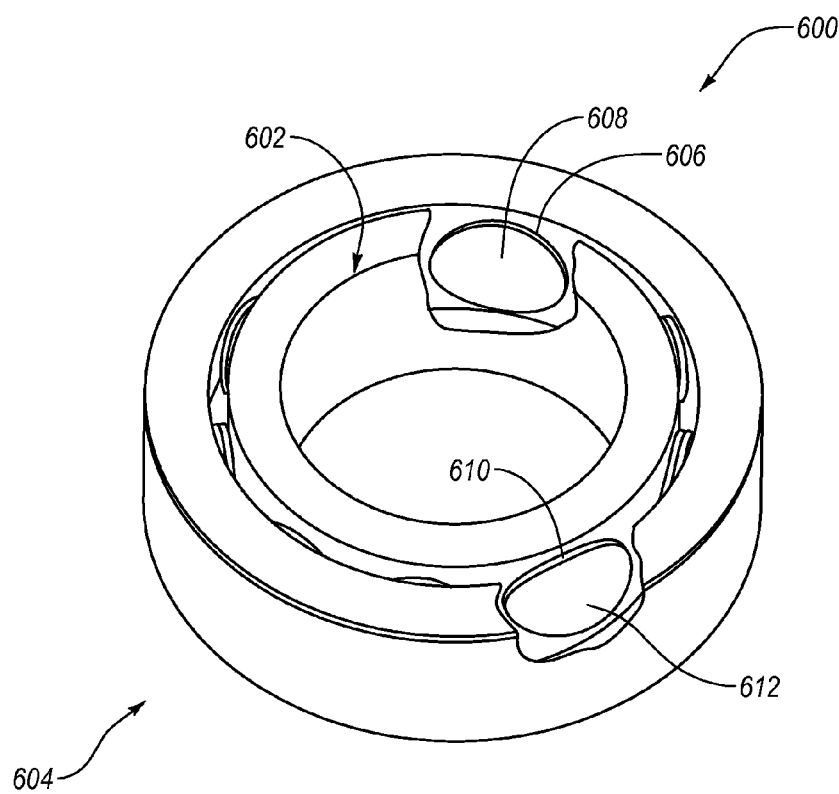
FIG. 6 is an isometric cutaway view of a radial bearing apparatus according to an embodiment, which may utilize any of the disclosed PDC fabricated according to any of the embodiments disclosed herein as bearing elements.

FIG. 6 is an isometric cutaway view of a radial bearing apparatus 600 according to an embodiment, which may utilize any of the disclosed PDC embodiments as bearing elements. The radial bearing apparatus 600 includes an inner race 602 positioned generally within an outer race 604. The outer race 604 includes a plurality of bearing elements 606 affixed thereto that have respective bearing surfaces 608. The inner race 602 also includes a plurality of bearing elements 610 affixed thereto that have respective bearing surfaces 612. One or more, or all of the bearing elements 606 and 610 may be configured according to any of the PDC embodiments disclosed herein. The inner race 602 is positioned generally within the outer race 604, with the inner race 602 and outer race 604 configured so that the bearing surfaces 608 and 612 may at least partially contact one another and move relative to each other as the inner race 602 and outer race 604 rotate relative to each other during use.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method for fabricating a leached polycrystalline diamond compact, comprising:
   providing a polycrystalline diamond compact including a polycrystalline diamond table bonded to a substrate, the polycrystalline diamond table including a plurality of bonded diamond grains defining a plurality of interstitial regions having an interstitial constituent disposed therein, the polycrystalline diamond table further including an upper surface and at least one side surface;
   forming a first chamfer extending between the upper surface and the at least one side surface of the polycrystalline diamond table, the first chamfer exhibiting a first chamfer height measured from the upper surface to a bottom of the first chamfer;
   after forming the first chamfer, leaching the polycrystalline diamond table to at least partially remove the interstitial constituent to form a leached region; and
   after the act of leaching, forming a second chamfer extending between the upper surface and the at least one side surface of the polycrystalline diamond table, the second chamfer exhibiting a second chamfer height.

2. The method of claim 1, wherein forming the second chamfer reduces a volume of the leached region.

3. The method of claim 1, wherein the second chamfer height is greater than the first chamfer height.

4. The method of claim 1, further comprising, after forming the first chamfer, removing material from a lateral surface of the polycrystalline diamond compact to a second depth.

5. The method of claim 4, wherein the second depth is at least about equal to the first chamfer height.

6. The method of claim 1, wherein the first chamfer height is less than about 400 μm.

7. The method of claim 1, wherein the first chamfer height is about 100 μm to about 250 μm.

8. The method of claim 1, wherein the first chamfer height is less than about 20 μm.

9. The method of claim 1, wherein the leached region of the polycrystalline diamond table extends from the upper surface of the polycrystalline diamond table to a depth that is within 100 μm of the second chamfer height.

10. The method of claim 9, wherein the depth is less than about 100 μm greater than the second chamfer height.

11. The method of claim 9, wherein the depth is about 50 μm to about 100 μm greater than the second chamfer height.

12. The method of claim 1, wherein the interstitial constituent includes a metallic catalyst.

13. A method for fabricating a polycrystalline diamond compact, comprising:
    providing a polycrystalline diamond compact including a polycrystalline diamond table bonded to a substrate, the polycrystalline diamond table including a first chamfer extending between an upper surface and at least one side surface, the polycrystalline diamond table further including a leached region that is substantially free of an interstitial constituent;
    removing a lateral portion of the polycrystalline diamond compact; and
    forming a second chamfer extending between the upper surface of the polycrystalline diamond table and the at least one side surface of the polycrystalline diamond table, the second chamfer removing the first chamfer.

14. The method of claim 13, wherein the first chamfer exhibits a first chamfer height, and wherein the second chamfer exhibits a second chamfer height that is greater than the first chamfer height.

15. The method of claim 13, wherein the first chamfer exhibits a first chamfer height, and wherein the second chamfer exhibits a second chamfer height that is about 1.5 to about 3 times the first chamfer height.

* * * * *